United States Patent [19]

Kuga

[11] Patent Number: 5,592,215
[45] Date of Patent: Jan. 7, 1997

[54] STEREOSCOPIC PICTURE SYSTEM AND STEREOSCOPIC DISPLAY PANEL THEREFOR

[75] Inventor: Kaeko Kuga, Kyoto, Japan

[73] Assignee: Rohm Co., Ltd., Kyoto, Japan

[21] Appl. No.: 451,435

[22] Filed: May 26, 1995

Related U.S. Application Data

[62] Division of Ser. No. 179,943, Jan. 11, 1994, abandoned.

[30] Foreign Application Priority Data

| Feb. 3, 1993 | [JP] | Japan | 5-16493 |
| Feb. 3, 1993 | [JP] | Japan | 5-16494 |
| Feb. 3, 1993 | [JP] | Japan | 5-16496 |

[51] Int. Cl.$^6$ ............................................. H04N 13/04
[52] U.S. Cl. ............................................. 348/51; 345/6
[58] Field of Search ............................................. 348/42, 43, 44, 348/46, 47, 48, 51, 52, 59; 345/6, 4, 102

[56] References Cited

U.S. PATENT DOCUMENTS

| 4,134,104 | 1/1979 | Karras | 345/6 |
| 4,647,965 | 3/1987 | Imsand | 348/47 |
| 5,113,272 | 5/1992 | Reamey | 345/4 |
| 5,184,117 | 2/1993 | Gauthier | 345/102 |

*Primary Examiner*—Amelia Au
*Attorney, Agent, or Firm*—Nikaido Marmelstein Murray & Oram LLP

[57] ABSTRACT

A stereoscopic picture system which offers a natural, stereoscopic picture allowing a plurality of people to see it at a time without wearing polarizing glasses. The stereoscopic picture system includes: a camera for identifying an image of a subject as an electrical signal; a control circuit for converting the electrical signal identified by the camera into control signals corresponding to x coordinate, y coordinate and z coordinate of three-dimensional coordinate system; a stereoscopic display panel having three-dimensionally arranged pixels for displaying a stereoscopic picture; and a driver circuit for driving the stereoscopic display panel on the basis of the control signals corresponding to x coordinate, y coordinate and z coordinate, which are fed from the control circuit.

2 Claims, 10 Drawing Sheets

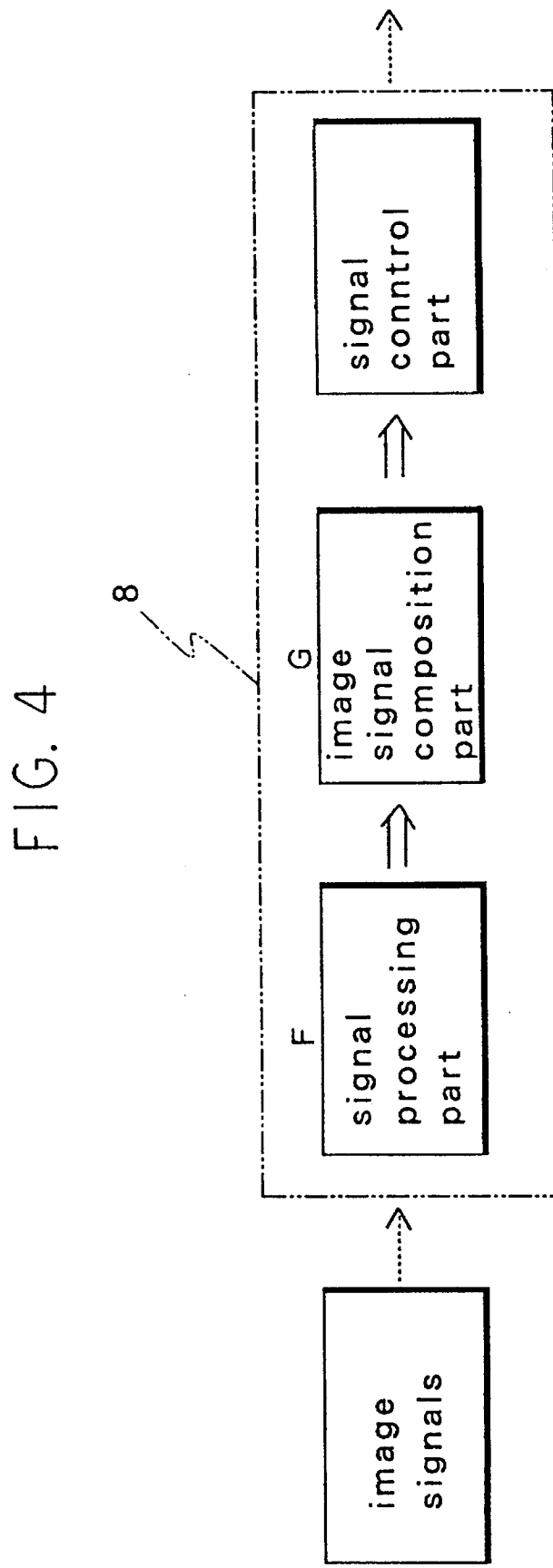

STEREOSCOPIC PICTURE SYSTEM AND STEREOSCOPIC DISPLAY PANEL THEREFOR

This is a divisional, of application Ser. No. 08/179,943 filed Jan. 11, 1994 abandoned.

FIELD OF THE INVENTION

The present invention relates to stereoscopic picture systems and stereoscopic display panels therefor. More particularly, it relates to a stereoscopic picture system capable of providing a stereoscopic picture to a naked eye without using special polarizing glasses, and it also relates to a stereoscopic display panel for use in such a system.

BACKGROUND OF THE INVENTION

Hitherto, there have been known two types of systems for obtaining a stereoscopic picture; namely, the different sight stereopsis system which utilizes the principle of stereogram and the three-dimensional image reproduction system which utilizes the priciple of holography. The former system gives images of the same subject from different view points to left and right eyes, respectively. The eyes would be in increasing strain after seeing the picture of this system for 30 minutes or more. Further, since the picture, per se, is not three-dimensionally displayed, a clear stereoscopic picture cannot be shown to a plurality of people at a time without wearing special polarizing glasses. The latter system reproduces rays of light around the subject. This system does not cause so much strain to the eyes but has many problems to be solved to achieve a satisfactory way of taking pictures and to apply them to a moving picture.

The different sight stereopsis system includes glasses-use modes such as stereoscopic video glasses mode, polarizing glasses mode, bichromatic glasses mode and different density glasses mode, and glasses—nonuse modes such as rotation mirror 360°—stereoscopic picture mode. In the stereoscopic video glasses mode, video cameras are located on the right and left sides in front of a subject and the right and left images are alternately displayed on a television field basis. For the picture thus presented to become a stereoscopic picture, each of the right and left images should be viewed by each of the right and left eyes, respectively, through stereoscopic video glasses adapted to alternately shut off the right and left eye sights synchronously with the picture.

The three-dimensional image reproduction system includes modes of superimposing a multiplicity of planes one upon another such as varifocal-mirror-use mode and varying refractive index mode, modes of forming a virtual image (wavefront) such as holography and holographic stereogram, and modes of forming a real image such as integral holography and solid three-dimensional display.

In the conventional different sight stereopsis system for general use wherein special polarizing glasses are placed adjacent to the eyes of a viewer to provide him/her with a stereoscopic picture, there have been problems, such as troublesomeness in wearing the glasses and asthenopia due to a long-time viewing of the picture.

Further, the different sight stereopsis system of the type utilizing stereoscopic video glasses requires a high-speed optical switch capable of perfectly following the right and left images displayed alternately for every 1/60 seconds (one field). A liquid crystal cell is unsatisfactory in the response to the speed.

It is, therefore, an object of the present invention to provide a stereoscopic picture system capable of providing a clear stereoscopic picture for a plurality of people to see at a time whenever they like without wearing polarizing glasses.

On the other hand, to realize a stereoscopic picture system providing a stereoscopic picture for many people to see from different directions by driving a stereoscopic display panel on the basis of the information of x, y and z coordinates for a three-dimensional subject and obtained through a camera, all the image signals covering the entire sectional area of a subject must be processed. For this reason, the circuits required, such as an operation circuit performing calculations for projecting a three-dimensional subject on a two-dimensional plane, are up-scaled thereby causing an increase in costs and in processing time. Thus, another object of the present invention is to solve such problems and to provide a stereoscopic picture system capable of realizing a high-speed processing with reduced circuit scale and reduced costs.

Yet another object of the present invention is to provide a stereoscopic display panel capable of displaying a three-dimensional picture directly from the information of a three-dimensional subject.

SUMMARY OF THE INVENTION

According to one aspect of the present invention, there is provided a stereoscopic picture system comprising:

a camera for identifying an image of a subject as an electrical signal;

a control circuit for converting the electrical signal identified by the camera into control signals of x coordinate, y coordinate and z coordinate, respectively of three-dimensional coordinate system;

a stereoscopic display panel having three-dimensionally arranged pixels for displaying a stereoscopic picture; and a driver circuit for driving the stereoscopic display panel on the basis of the control signals of x coordinate, y coordinate and z coordinate which are fed from the control circuit.

Further, a stereoscopic display apparatus as used in the above system comprises:

a stereoscopic display panel;

a driver circuit for driving the stereoscopic display panel on the basis of control signals of x coordinate, y coordinate and z coordinate, respectively; and a light source to be driven by the driver circuit.

In the stereoscopic display apparatus, preferably, light of the light source is projected on the stereoscopic display panel from the front and reflected thereat to form a stereoscopic picture.

According to another aspect of the present invention, there is provided a stereoscopic picture system comprising:

a camera for identifying an image of a subject as an electrical signal;

a control circuit for converting the electrical signal identified by the camera into signals corresponding to an x-axis component, a y-axis component and a z-axis component for the three-dimensional image, respectively;

a coordinate transformation circuit for creating a sectional image data of the subject in any position from the signals for the three-dimensional image;

a signal-processing circuit for converting the sectional image data into control signals of an outline of the subject in terms of x coordinate, y coordinate and z coordinate in the three-dimension by processing the sectional image data to shift on at least x axis and y axis;

a stereoscopic display panel having three-dimensionally arranged pixels for displaying an stereoscopic picture; and a driver circuit for driving the stereoscopic display panel on the basis of the control signals fed from the signal-processing circuit.

According to yet another aspect of the present invention, there is provided a stereoscopic display panel comprising a plurality of flat display panels stacked one upon another in a viewing direction, each having strip-like film electrodes respectively formed on both sides thereof such that the film electrodes on one side cross those on the other side to form pixels arranged in a matrix.

According to still another aspect of the present invention, there is provided a stereoscopic display panel comprising a plurality of flat display panels stacked one upon another vertically to a normal viewing direction, each having strip-like film electrodes respectively formed on both sides thereof such that the film electrodes on one side cross those on the other side to form pixels arranged in a matrix, whereby pixels being driven are viewed from a lateral side of the panel.

According to yet still another aspect of the present invention, there is provided a stereoscopic display panel comprising a liquid crystal block in the form of a rectangular parallelpiped or cube, and strip-like film electrodes respectively formed on an upper surface, a lower surface and a pair of opposite lateral sides of the liquid crystal layer, the film electrodes on the upper and lower surfaces of the liquid crystal layer going across each other in a matrix, the electrode films on the opposite lateral sides crossing each other in a matrix.

In the stereoscopic picture system of the present invention, the camera identifies information of a three-dimensional subject of x, y and z coordinates, and the stereoscopic display panel displays a three-dimensional image on the basis of the three-dimensional information. Hence, the system of the present invention readily provides a clear, real, stereoscopic picture of high quality which can be seen without wearing polarizing glasses. In addition, a plurality of persons are able to see the same picture at the same time.

Further, sectional image data of the subject is erased except the outline thereof, and then only the data of the outline is fed to the driver circuit and processed therein. Hence, there is no need to process the coordinates of inside data (data other than the data of the outline) of the subject, which results in a lessened amount of data to be processed, reduction in circuit scale, and increased processing speed.

In the stereoscopic display panel, a plurality of flat display panels are stacked one upon another in the normal viewing direction thereby arranging pixels three-dimensionally.

BRIEF DESCRIPTION OF THE DRAWINGS

FIG. 4 is a circuit diagram showing one embodiment of a signal-processing circuit according to the present invention;

DETAILED DESCRIPTION

A stereoscopic picture system according to the present invention will now be described in detail with reference to the drawings.

Figure 1:
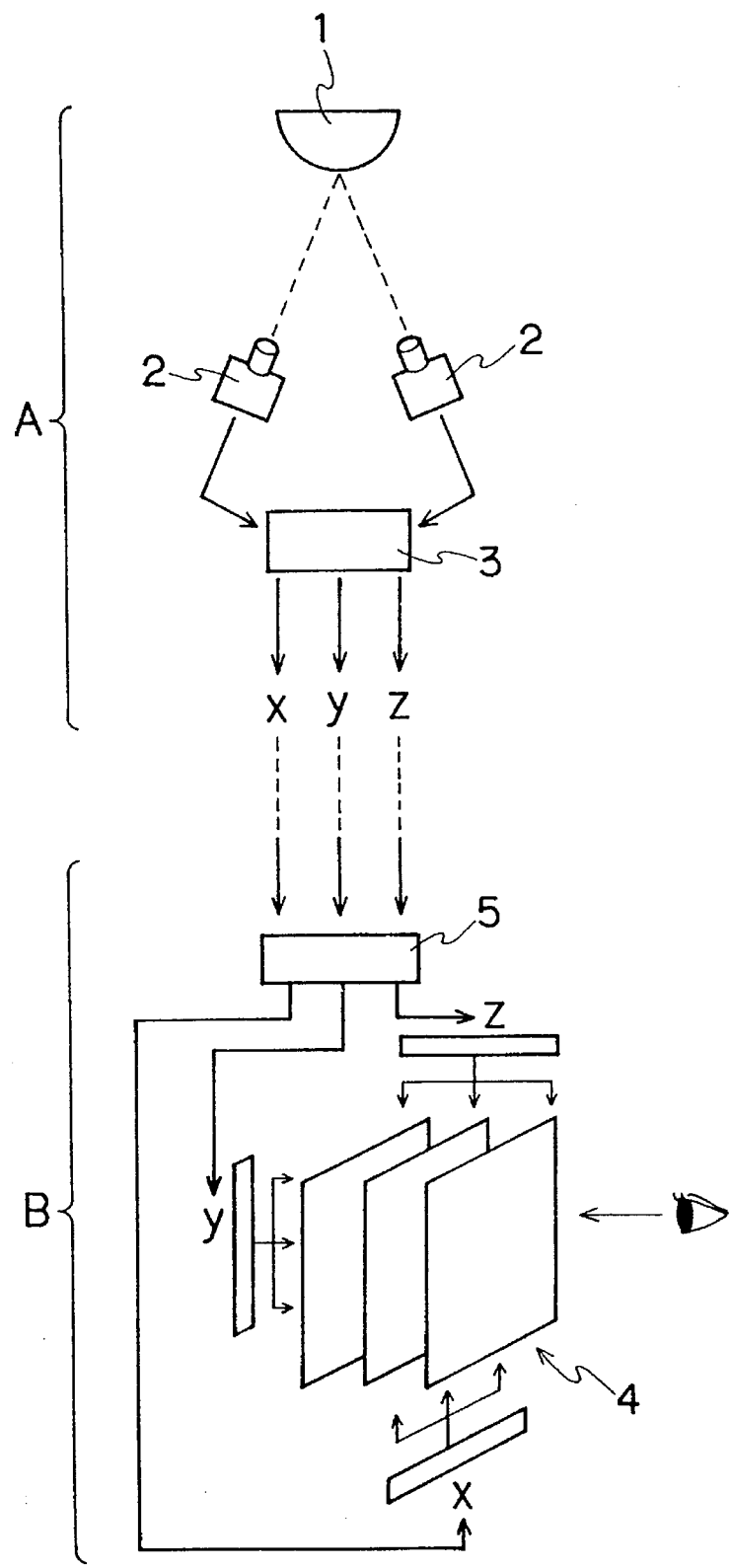
FIG. 1 is a schematic explanatory view showing the configuration of one embodiment of a stereoscopic picture system according to the present invention.

Referring to FIG. 1, numeral 1 denotes a subject of which image is identified as an electrical signal by camera 2. The electrical signal of the identified image is converted by controlling a circuit 3 into control signals of x, y and z coordinates three-dimensionally. The respective signals of x, y and z coordinate components are fed from the control circuit 3 to a driver circuit 5 which then drives stereoscopic display panel 4 (including three panels in this embodiment).

In FIG. 1 the stereoscopic picture system comprises camera section A and stereoscopic display apparatus B.

Camera section A comprises a camera or cameras 2 and the control circuit 3 and encodes the image of subject 1 into positional information in terms of individual coordinates of x, y and z and into chromatic information corresponding to the positional information. The use of two cameras advantageously makes it possible to get the depth information of subject 1 easily. The present invention is characterized in that the z coordinate component representing the depth of subject 1 is added to conventional information of x and y coordinates only in two-dimension by thus obtaining the positional information of subject 1 which includes x coordinate component, y coordinate component, and z coordinate component of the depth of subject 1.

Camera 2 comprises an image-receiving element for converting the image from the lens optical system into electrical signals and a lens optical system, such as made of convex lens, for imaging the subject on an image-receiving element.

The image-receiving element is usually comprised of a solid-state imaging device such as charge-coupled device (hereinafter referred to as "CCD") or charge-injection device (hereinafter referred to as ("CID"). The image-receiving element may, alternatively, be comprised of a solid-state photosensitive device, such as MOS image sensor, a pickup tube or the like. The CCD and CID are able to collectively catch the image information as electrical signals, while in the case of the pickup tube or the like, the image information needs to be converted at display panel into electrical signals terms of a scanning circuit as will be described later.

Control circuit 3 converts the image received at camera 2 into digital positional information and chromatic information and is comprised of a circuit similar to that conventionally used to convert a two-dimensional image into positional information terms of x and y coordinates. Such a circuit formed of a coordinate transformation circuit such as A/D converter. In the present invention, information of the depth of the subject is also detected and, hence, there is also provided a coordinate transformation circuit for converting such information into positional information terms of z coordinate.

Stereoscopic display apparatus B comprises a light-emitting part, stereoscopic display panel 4 for displaying a stereoscopic image, and driver circuit 5 for driving each pixel of stereoscopic display panel 4 or actuating a light source so as to form the image of subject 1 on display panel 4 on the basis of signals fed from control circuit 3.

Driver circuit 5 is comprised of a coordinate transformation circuit and a D/A converter. The driver circuit 5 causes each of driving elements, such as thin film transistors, for pixels or the light source to be turned on such that voltage is applied to corresponding pixels of display panel on the basis of the positional information of x, y and z coordinates and the chromatic information fed from control circuit 3. For the color display, the color light source is driven. Driver circuit 5 may be formed of circuits similar to those conventionally used for a two-dimensional picture system.

Figure 2:
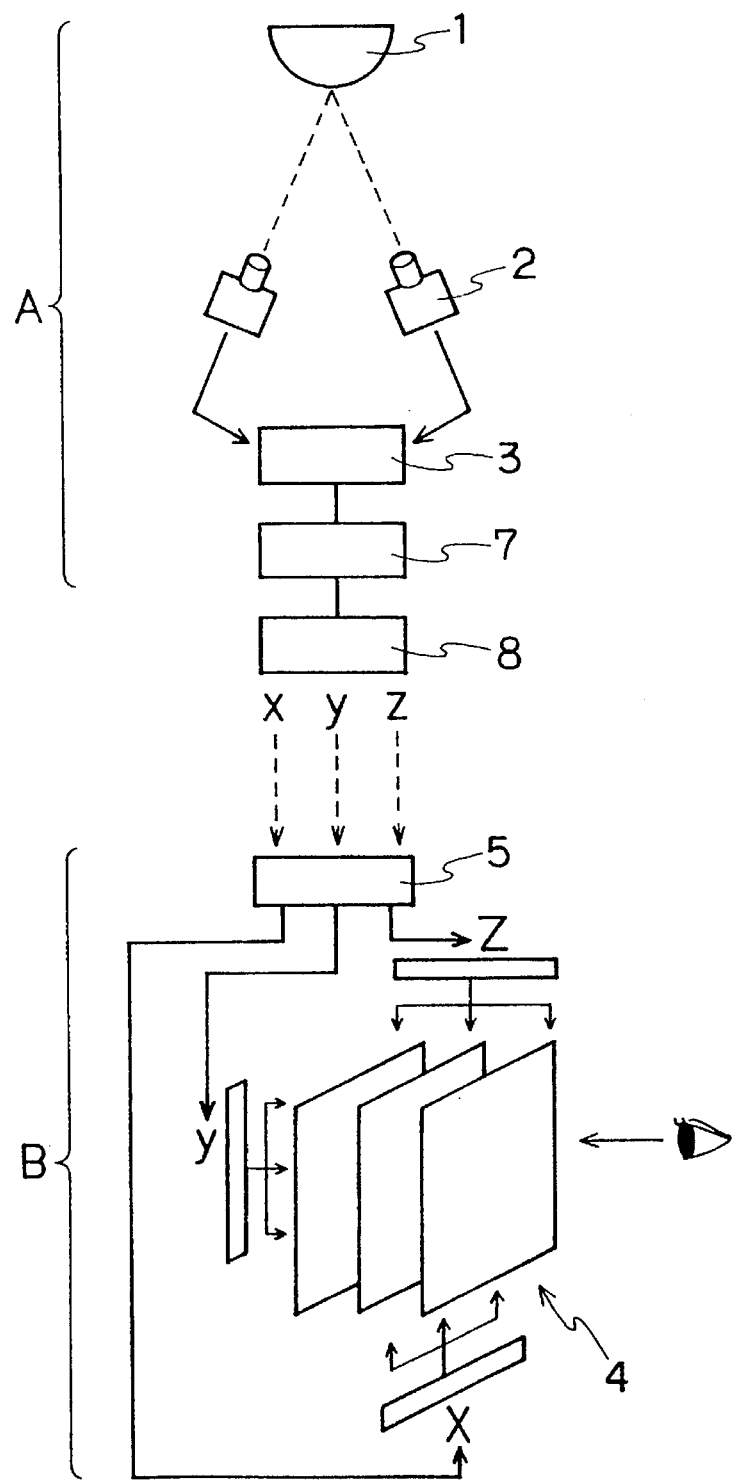
FIG. 2 is a schematic explanatory view showing the configuration of another embodiment of a stereoscopic picture system according to the present invention.

FIG. 2 shows another embodiment of the stereoscopic picture system of the present invention, wherein the signal processing for three-dimensional information input through camera 2 is simplified and hence can be performed at high speed with the circuits scaled down. In FIG. 2 numeral 1 denotes a subject of which image is identified as electrical signals by camera 2. The electrical signals of the identified image are converted into three-dimensional image signals including components on x, y and z axes by control circuit 3. From the image signals coordinate transformation circuit 7 creates sectional image data of subject 1 in any position. The sectional image data is processed by signal-processing circuit 8 in such a manner that it is slightly shifted on the x axis and overlapped portions of the initial data and shifted data are erased to form an outline on the x axis, that similarly it is slightly shifted on the y and overlapped portions are erased to form an outline on the y axis, and that the individual outlines on x axis and y composed into an outline in an xy plane of subject 1 in any position. The positional data of the thus formed outline converted into control signals corresponding to x, y and z coordinates in three-dimensions. Driver circuit 5 receives from signal-processing circuit 8 the signals of x, y and z coordinate components and drives stereoscopic display panel 4 (including three panels in this embodiment) on the basis of such signals.

In FIG. 2 the stereoscopic picture system comprises camera section A and stereoscopic display apparatus B.

Camera section A comprises a camera or cameras 2, control circuit 3, coordinate transformation circuit 7 for forming the outline of an image, and signal-processing circuit 8 and encodes the outline of the image of subject 1 into positional information in terms of individual coordinates of x, y and z and into chromatic information corresponding to the positional information. The use of two cameras advantageously makes it easy to get the depth information of subject 1. The present invention is characterized in that a z coordinate component representing the depth of subject 1 is added to conventional information of x and y coordinates only in the two-dimension by thus obtaining the positional information of subject 1 which includes x coordinate component, y coordinate component, and z coordinate component representing the depth of subject 1 while a stereoscopic image is displayed without the processing of the internal data (data within the outline) such as calculation of the coordinates of the internal data.

To be described next with reference to FIGS. 3(a)–3(d) is the way of creating individual coordinate information of the outline portion of the image from the image received by camera 2. FIG. 2 illustrates the process of extracting the outline of an image in a signal processing system incorporated in the stereoscopic picture system of the present invention.

Figure 3A:
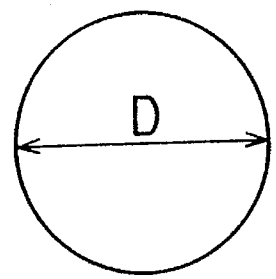
FIGS. 3(a) through 3(d) are explanatory diagrams for illustrating how a signal-processing system obtains the outline of a subject in another embodiment of a stereoscopic picture system according to the present invention.
Figure 3B:
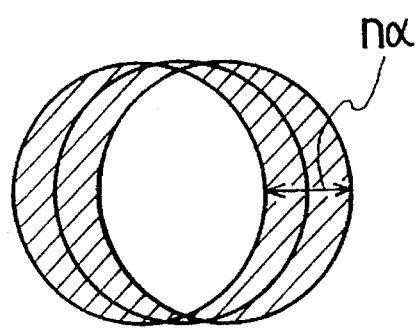

As in the conventional manner, sectional image data can be obtained by projecting, for example, point p (x, y, z ) of a three-dimensional subject an xy plane with use of coordinate transformation circuit 7 to form an orthographic projection image thereof. The orthographic projection image herein assumes, for example, a circle of diameter D as shown in FIG. 3(a). To obtain the coordinate information of the outline of the image from the sectional image of the subject, signal-processing circuit 8 as shown in the block diagram of FIG. 4 is used. First, the sectional translated on the x axis as shown in FIG. 3(b) by a signal processing part indicated by reference character F in FIG. 4. Assume the minimum distance of translation be α and the number of sectional images to be obtained be n, α is suitably about 5% to about 10% of diamter D and n is suitably about 3 to about 5. A stereoscopic image becomes clearer and sharper with decreasing α and n. The values α and n should not be too small, or too much time is required for the processing, because sectional image data on many points in terms of the z coordinate must be calculated.

Generally, the operation of translating space coordinate (x, y, z) by Tx on the x axis, by Ty on y axis, and by Tz on the z axis is to multiply homogeneous coordinate [Wx, Wy, Wz, W] using parameter W by a coordinate transform matrix having four rows and four columns and is represented by the formula:

$$[x, y, z, 1] \begin{bmatrix} 1 & 0 & 0 & 0 \\ 0 & 1 & 0 & 0 \\ 0 & 0 & 1 & 0 \\ Tx & Ty & Tz & 1 \end{bmatrix}$$

In the case of the sectional image shown in FIG. 3(a), the sectional image is translated on x axis by α, 2α, 3α, . . . , nα, n images are obtained by transforming the resultant images using the coordinate transform matrix where Ty=Tz=0, and Tx=α, 2α, . . . , nα, and n images are superposed on one another as shown in FIG. 3(b). Image signal composition part G in FIG. 4 then reads out only the signals representing the overlapped portion of the images and feeds the signals to the driver circuit to erase them. As a result there is left only an outline represented by the hatched portion and having a width nα on x axis.

Figure 3C:
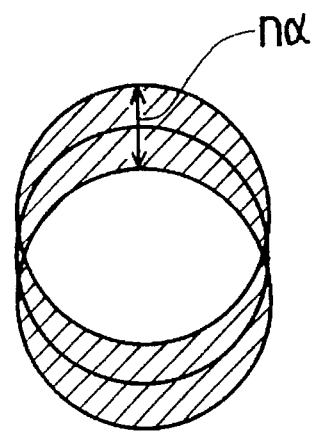
Figure 3D:
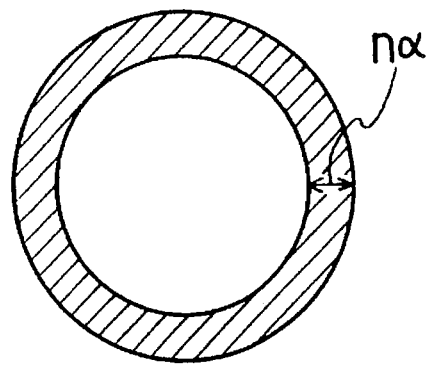

When an operation similar to the above is performed for y axis as shown in FIG. 3(c), there is obtained an outline having a width nα on the y axis. These two images, or outlines, are then composed to form an outline having a width n a as shown in FIG. 3(d).

Although the image is herein translated in the plus directions on the x and y axes, it may be translated in minus directions on the x and y axes. In this case Ty=Tz=0 and Tx=−α, −2α, . . . , −nα in the coordinate transform matrix. Alternatively, the may be translated in both plus and directions. For example, when n ( including the original sectional image) is an odd number and the image is translated in both plus and minus directions on x axis by equal distance, the values in the coordinate transform matrix assume $$Ty = Tz = 0, Tx = -\left(\frac{n-1}{2}\right)\alpha,$$
$$-\left(\frac{n-3}{2}\right)\alpha, \ldots, -\alpha, 0, \alpha, \ldots, \left(\frac{n-1}{2}\right)\alpha$$

Control signals represented by x, y and z coordinates, respectively, of the thus processed image are fed to driver circuit 5.

Stereoscopic display apparatus B comprises a light-emitting section, stereoscopic display panel 4 for displaying a stereoscopic picture, and driver circuit 5 for driving each pixel of display panel 4 or actuating a light source so as to form the image of subject 1 on the display panel 4 on the basis of signals from signal-processing circuit 8.

Driver circuit 5 comprises individual driver circuits for x, y and z axes and level-shifts the control signals of positional information of x, y and z coordinates and of chromatic information to expand them a voltage value for displaying. On the basis of the expanded control signals, driver circuit 5 turns on the driving elements, such as thin film transistors of pixels or the light source such that voltage is applied to a corresponding pixel of stereoscopic display panel 4. In the case of color display a color light source is driven. The circuits used in driver circuit 5 may be those used for the conventional two-dimensional picture system.

Although the signal-processing part is incorporated in camera section A in this embodiment, it may be incorporated into stereoscopic display apparatus B. However, for reduction in the scale of circuit it is more effective to incorporate the signal-processing part into camera section A than into stereoscopic image forming device B.

Figure 5:
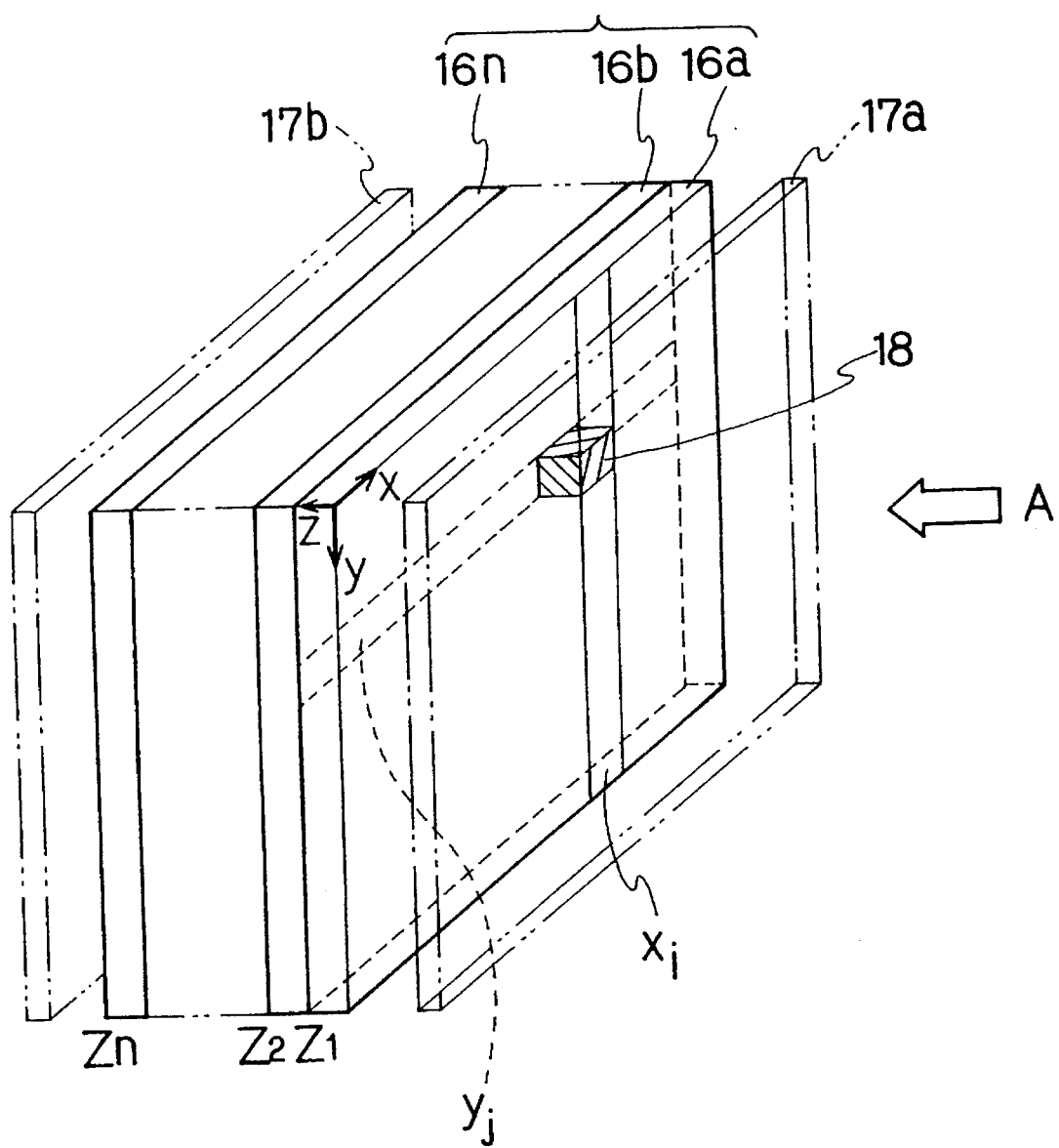
FIG. 5 is a schematic representation illustrating one embodiment of a stereoscopic display panel according to the present invention.
Figure 6:
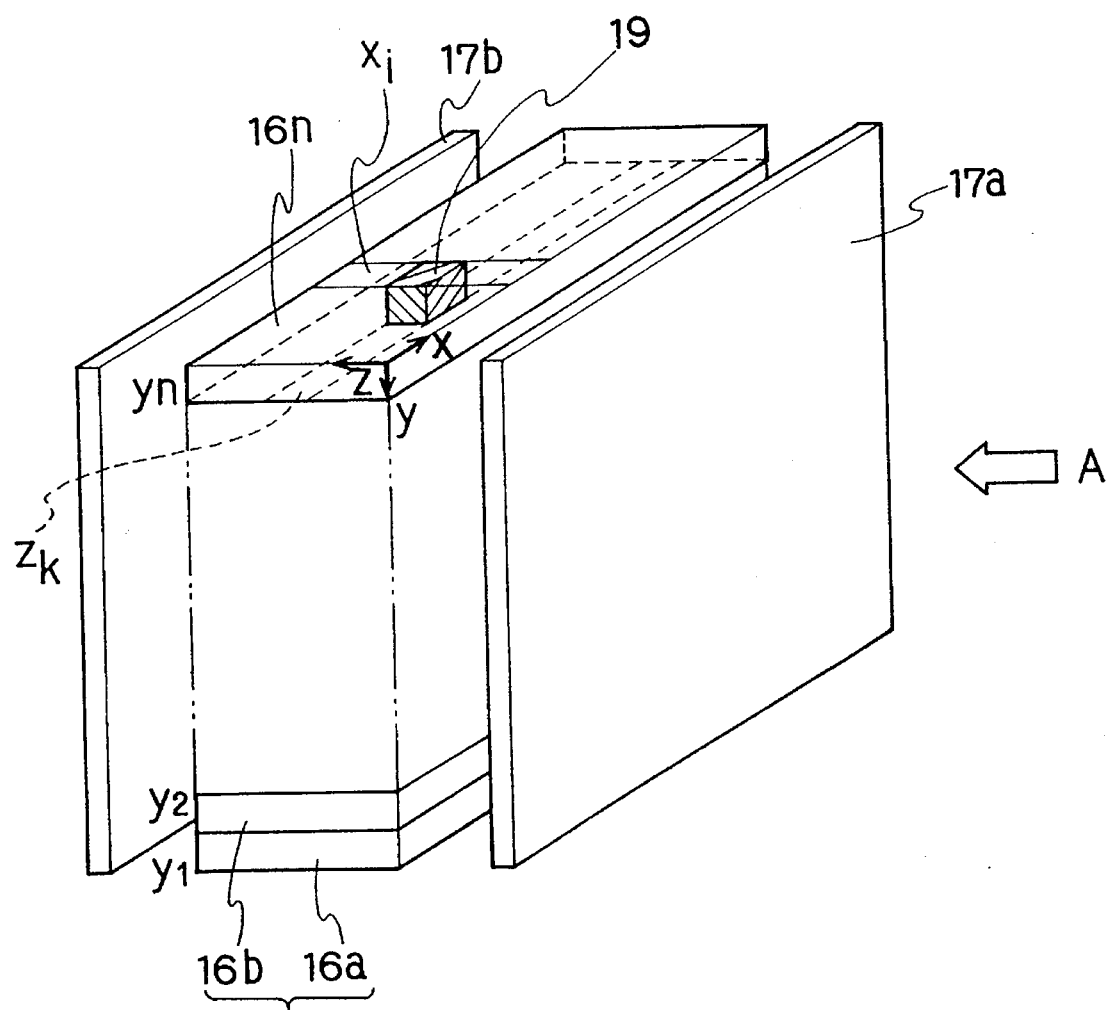
FIG. 6 is a schematic representation illustrating another embodiment of a stereoscopic display panel according to the present invention.
Figure 7:
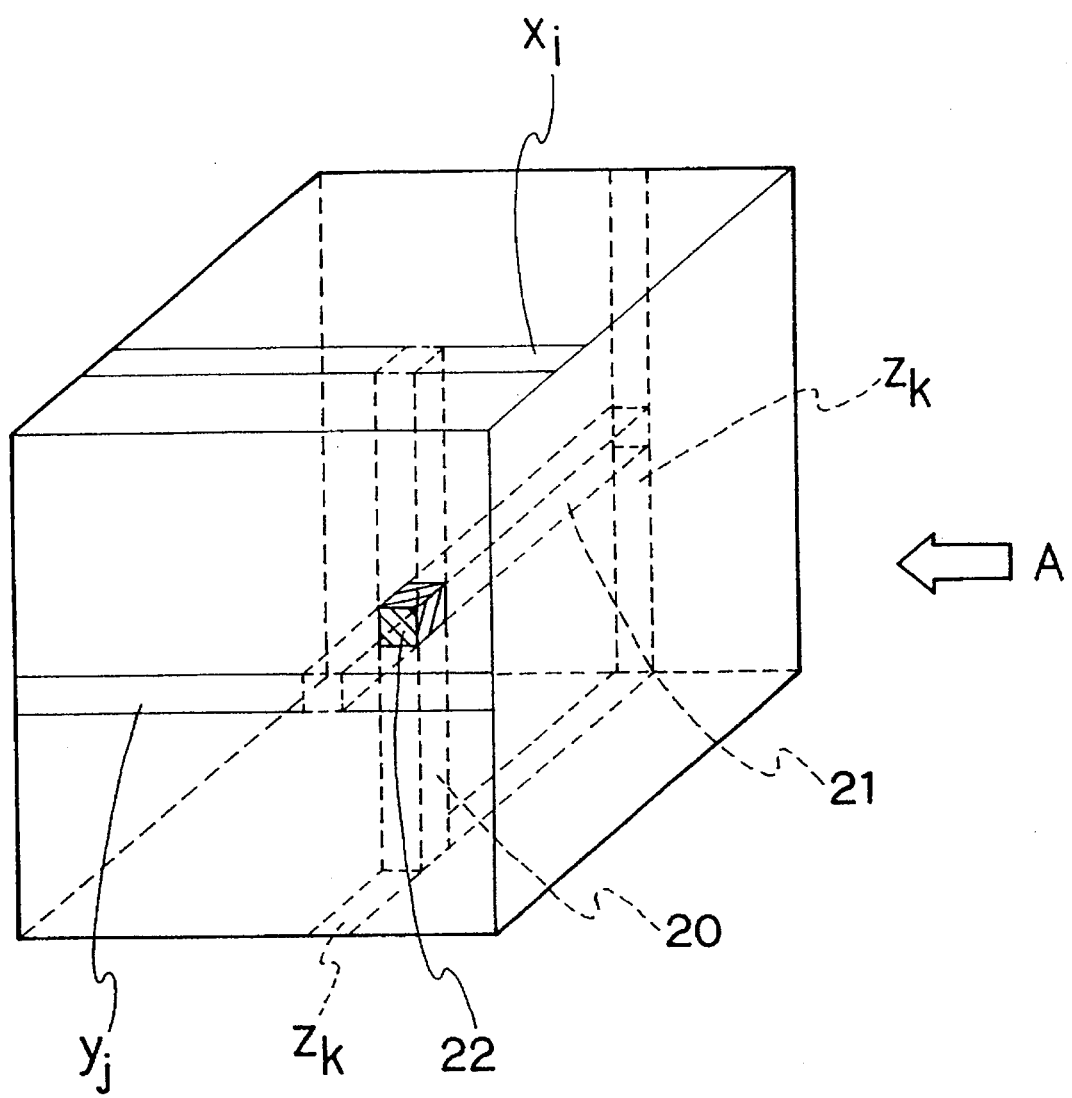
FIG. 7 is a schematic representation illustrating yet another embodiment of a stereoscopic display panel according to the present invention.

Stereoscopic display panel 4 may be of the structure as shown in, for example, FIG. 5, FIG. 6 or FIG. 7.

FIG. 5 illustrates one embodiment of the stereoscopic display panel of the present invention, wherein a plurality of flat display panels 6a, 16b, . . . , 16n are stacked on top of another in the normal viewing direction.

Each of flat display panels 16a, 16b, . . . , 16n is formed of, for example, a liquid crystal display panel or an electrochemical display panel and comprises a pair of transparent substrates facing to each other, strip-like film electrodes individually formed on the substrates so as to intersect each other in a matrix pattern, and an photoelectric conversion material provided between the substrates. Flat display panels 16 are each adapted to selectively drive pixels formed by the strip-like film electrodes and arranged a matrix pattern. Taking a liquid crystal display panel for instance, it is of the arrangement wherein a plurality of strip-like film electrodes and an orientation film are formed on a transparent substrate such as glass substrate, two such transparent substrates are positioned so that the respective film electrodes thereof intersect each other and face to each other, and a liquid crystal material is encapsulated between the substrates. When the flat display panel is a liquid crystal panel, polarizing plates 17a and 17b are disposed on both sides, respectively, of the panel.

In this stereoscopic display panel a selected pixel is driven by driver circuit 5 on the basis of the control signals representing the subject in terms of x, y and z coordinates and fed from control circuit 3 of camera section A. Specifically, when control signals of $x_i$, $y_j$ and $z_1$ are fed to the display panel shown in FIG. 5, pixel 18 is driven which is located at a point where electrode $x_i$, or the i th electrode of the electrodes arranged in columns on the frontal side of flat display panel 16a that is the nearest to the viewer, intersects electrode $y_j$ which is the j th electrode of the electrodes arranged in rows on the back side of flat display panel 16a. Thus, pixels can be three-dimensionally driven with control signals of x, y and z coordinates to form a stereoscopic picture.

The pixels being not driven by driver circuit 5 permit light from backlight to pass therethrough, while the pixel driven corresponding to the coordinates ($x_i$, $y_j$, $z_1$) shades light. The formation of picture is not necessarily based on the use of light passing through pixels. A picture may be formed by the use of light projecting on a display panel from the front side thereof.

Flat display panel 16a is of any size and may be formed of a conventional flat display panel of any size. Although two or three stacked flat display panels assure an image having a depth to sufficiently exhibit the effect of stereoscopic picture, the stereoscopic effect increases with increasing number of flat display panels to be stacked. With this stereoscopic display panel, the display can be achieved by shading light from a light source located on the back side of the panel or by applying light to the panel from the front to reflect it at a pixel being driven. Where reflected light is used, a color display can be realized when desired.

FIG. 6 illustrates another embodiment of the stereoscopic display panel of the present invention. In this embodiment flat display panels 16a, 16b, . . . , 16n are stacked vertically and adapted to display a stereoscopic picture with three-dimensionally arranged pixels by utilizing transmission or reflection of light from a lateral side of the thus stacked panels. When control signals respectively corresponding to, for example, $x_i$, $y_n$ and $z_k$ coordinates are fed to this stereoscopic display panel, driver circuit 5 drives pixel 19 which is located on a point where film electrode $x_i$, or the i th film electrode of the film electrodes formed on the upper surface of the n th panel 16n, intersects film electrode $z_k$, or the k th film electrode of the film electrodes on the lower surface of panel 16n. Thus, the three-dimensionally arranged pixels can be driven with control signals respectively corresponding to x, y and z coordinates, thereby forming a stereoscopic picture. Like the previous embodiment, the stereoscopic display panel of this embodiment can realize display by either transmission or reflection of light. Note that in this embodiment too, polarizing plates 17a and 17b are provided on the upper and lower surfaces, respectively, of a flat display panel if the flat display panel is a liquid crystal display panel.

Although this embodiment may use a conventional display panel of any size as in the previous embodiment, the length on z axis of a panel is preferably about one to about several tens in centimeter. The size of display screen depends on the number of flat display panels to be stacked. In this embodiment too, a light source may be located on the back side of the stereoscopic display panel to display a picture with use of transmission of light or located on the front side to apply light on the panel thereby displaying a picture with use of reflection of light.

FIG. 7 illustrates yet another embodiment of the stereoscopic display panel of the present invention. In this embodiment liquid crystal is encapsulated in a rectangular-parallelpiped or cubic panel comprised of transparent substrates at least on the frontal side and back side, with respect to the viewing direction, of the liquid crystal block. On the upper surface of the panel are disposed film electrodes $x_1, x_2, \ldots, x_n$, while on the lower surface thereof are disposed film electrodes $z_1, z_2, \ldots, z_n$. The electrode films on the upper surface cross those on the lower surface in a matrix. Similarly, on the left-hand surface of the panel are disposed film electrodes $y_1, y_2, \ldots, y_n$, while on the right-hand surface thereof are disposed film electrodes $z_1, z_2, \ldots, z_n$. The electrode films on the left-hand surface cross those on the right-hand surface in a matrix. In this arrangement pixel 22, for example, is driven which is located at a point where vertical pixel line 20 of $x_i z_k$ pixels in terms of xz coordinates associated with the upper and lower surfaces of the panel intersects horizontal pixel line 21 of $y_i z_k$ pixels in terms of yz coordinates associated with the left-hand and right-hand surfaces of the panel. In this case liquid crystal molecules in the pixel lines 20 and 21 are inverted to exhibit a grey color, so that pixel 22 on the intersecting point of these pixel lines completely blocks light. Liquid crystal molecules in the pixel portion not driven permit light to pass therethrough. Thus, a stereoscopic picture can be displayed. This stereoscopic display panel, also, can realize display of a picture by utilizing transmission of light from a light source located on the back side of the panel or reflection of light (including colored light) projecting from the front side by an inverted liquid crystal molecule. It is noted that the electrodes on the left-hand and right-hand surfaces of the panel may alternatively be provided on the frontal and back surfaces, respectively, of the panel.

If the size of the block shown in FIG. 7 is made large, an electric field to be applied to a central portion thereof is weakened so that the inversion of liquid crystal molecules in such a portion becomes insufficient thereby decreasing the contrast of the resultant picture. For this reason, one side of the display is preferably about 10 to about 20 cm. In the liquid crystal stereoscopic display panel employing such a liquid crystal display, a picture can be displayed by inverting selected pixels to shade the light while transmitting the light through other pixels. In this case applying colored light to an inverted liquid crystal molecule makes it possible to achieve a color display. Further, a reflection-type stereoscopic display can also be achieved by applying light to the panel from a light source located on the front side to make it reflect at an inverted liquid crystal molecule.

Although a liquid crystal display is used in the stereoscopic display panel of this embodiment, flat display panels such as an electrochemical display or an electrophoresis display may be used in a stacked manner. Alternatively, a plurality of fluorescent screens for a CRT may be provided in layers so that the location of the image to be formed can be chosen.

In stereoscopic display panel 4 a desired pixel is selected and voltage is applied across the corresponding pair of electrodes facing to each other to drive that pixel. To this end, stereoscopic display panel 4 is so designed that scanning signals are applied to x, y and z axes, respectively, to turn on only the pixel corresponding to the information in terms of x, y and z coordinates which is fed from camera section A.

Figure 8:
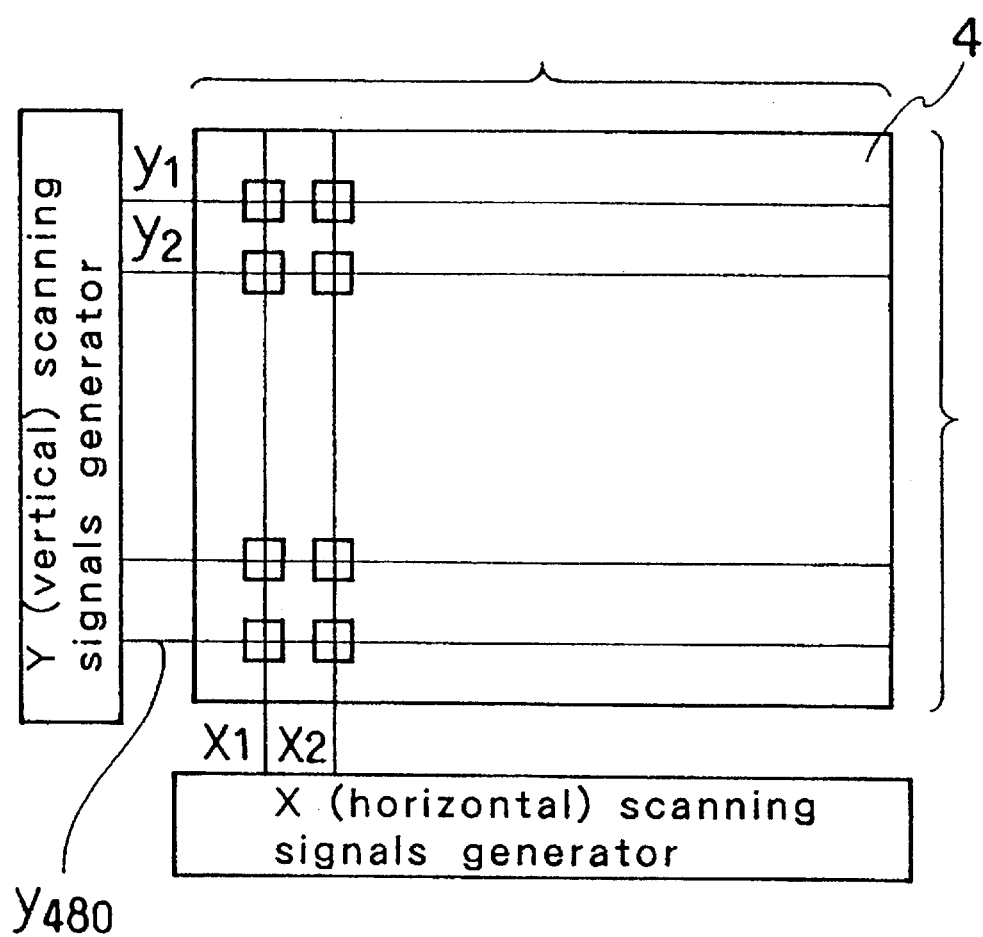
FIG. 8 is a schemtaic representation for illustrating an example of scanning on a stereoscopic display panel for use a stereoscopic picture system according to the present invention.
Figure 9:
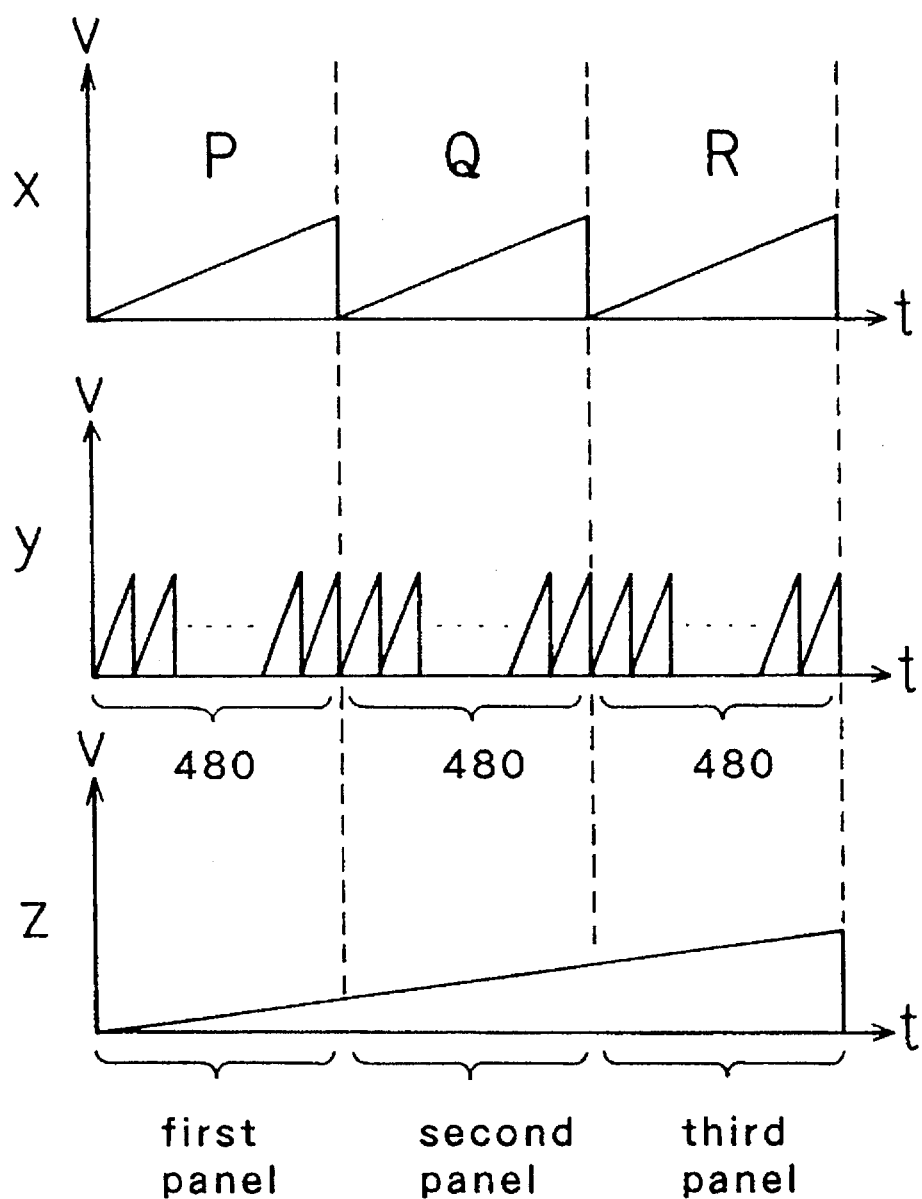
FIG. 9 is a graphic representation illustrating an example of scanning signal for a stereoscopic display panel, wherein the relation is shown between time and one pattern of signal on each coordinate axis which scans three-dimensionally arranged pixels.
Figure 10:
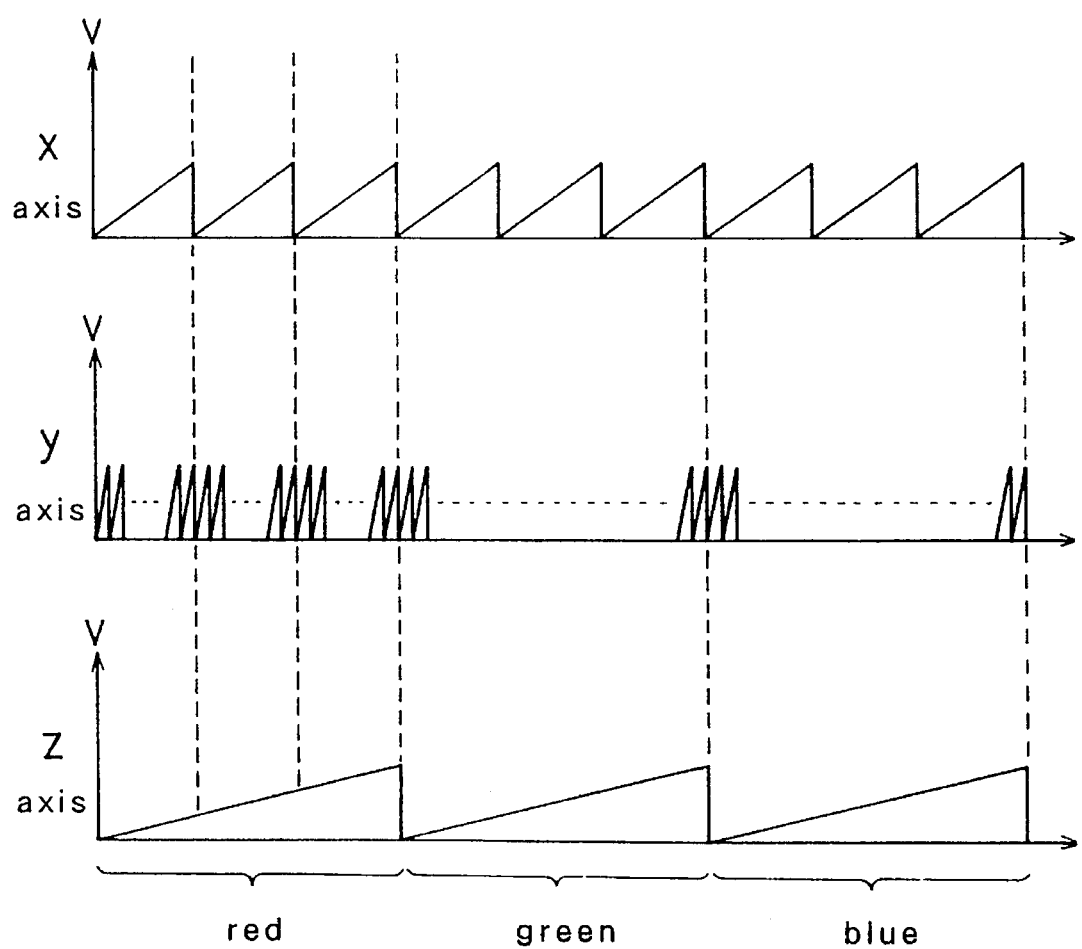
FIG. 10 is a graphic representation illustrating an example of scanning signal for a stereoscopic display panel, wherein the relation is shown between time and one pattern of signal on each coordinate axis which scans three-dimensionally arranged pixels in color display.

To be described next is an example of scanning on stereoscopic display panel 4. FIG. 8 is a plan view of a matrix-type display panel; FIG. 9 is a graphic representation showing voltage waveforms (V) of scanning signals applied along x, y and z axes, respectively, against time (T); and FIG. 10 is also a graphic representation showing voltage waveforms (V) of scanning signals for color display. In these graphic representations examples of scanning signals for x, y and z axes are shown in descending order. FIG. 9 shows examples of scanning signals applied to, for example, a stereoscopic display panel comprising three display panels arranged on z axis, each having 640 pixels on x axis and 480 pixels on y axis as shown in FIG. 8.

The entire screen area of the first display panel can be scanned by scanning from the upper-left to the lower-right of the xy plane in such a manner that first $x_1$ to $x_{640}$ on $y_1$ coordinate, then those on $y_2$ coordinate are scanned and such scanning is conducted until $x_1$ to $x_{640}$ on $y_{640}$ coordinate. This state is a state indicated at reference character P in FIG. 9, wherein an even voltage is applied to x coordinate while scanning is performed 480 times for y coordinate. Reference characters Q and R indicate scanning over the second and third panels, respectively. Accordingly, if the scanning pattern shown in FIG. 9 is performed once, all the pixels with respect to x, y and z coordinates are scanned.

In the case of color display, scanning for red, green and blue needs to be performed on each of the panels, so that scanning is repeated for the three colors, red, green and blue as shown in FIG. 10. Accordingly, scanning of one pattern is completed by performing scanning three times as many as the scanning for the previous example. With the current technology, scanning can be performed at a speed of about 300,000 times per second, which value is sufficient for realizing a color display. Although a higher frequency is required to obtain a clear moving picture, there is no need increase the number of times of scanning if using a technique such as data compression in which pseudo-data is created between two adjacent scanning lines.

For the light source may be used a back light for common use as in a conventional liquid crystal display when in monochromatic display. In realizing color display, on the other hand, light sources of LED or laser for, for example, three primary colors (red, green and blue) may be used which are adapted to be driven simultaneously with corresponding pixels on the basis of xy coordinates. Besides using transmission of light from the light source located on the back side of the panel, reflection of light located on the front side may be used. In this case light is reflected by, for example, a pixel at which liquid crystal molecules are inverted, while light passes through a pixel at which liquid crystal molecules are not inverted. When reflection of light is used, color display can be obtained by using light sources for three primary colors, red, green and blue as the light source located on the front side and causing them to synchronize with positional information represented by x, y and z coordinates.

According to the present invention, as has been described, three-dimentional information of a subject is converted into image signals, then processed by the control circuit and the driver circuit to correspondingly drive pixels which are three-dimensionally arranged in the stereoscopic display panel and to drive the light source, thereby displaying the pixels stereoscopically. This results in the projection of a clear, natural stereoscopic picture on the stereoscopic display panel.

Further, according to the present invention, three-dimensional information of a subject is converted into image signals, then sequentially processed by the control circuit, the signal-processing circuit for generating control signals representing only the outline of the subject and the driver circuit to correspondingly drive pixels of the stereoscopic display panel and the light source. Hence, the stereoscopic image can be processed for shortened time with simplified circuitry of reduced scale. This results in a clear, natural stereoscopic picture even in motion at a high speed.

Since the present invention eliminates the need of wearing polarizing glasses and allows a plurality of viewer to simultaneously see a picture, the system of the present invention may be used in display apparatus of virtual reality system, a 3-D television system, a 3-D personal computer, a 3-D work station and the like, as well as a CAD system, a movie, and control display devices or simulators of spacecraft, ship, airplane and the like.

While only certain presently preferred embodiments have been described in detail, as will be apparent with those familiar with the art, certain changes and modifications can be made without departing from the spirit and scope of the invention.

What is claimed is:

1. A stereoscopic picture system comprising:

at least two cameras for identifying an image of a subject as electrical signals;

a control circuit for converting the electrical signals identified by the cameras into control signals corresponding to x coordinate, y coordinate and z coordinate of a three-dimensional space coordinate system;

a stereoscopic display panel having three-dimensionally arranged pixels for displaying a stereoscopic picture; and a driver circuit for driving the stereoscopic display panel on the basis of the control signals corresponding to x coordinate, y coordinate and z coordinate which are fed from the control circuit, wherein said stereoscopic display panel is three-dimensionally formed by superposing a plurality of flat display panels, said three-dimensionally formed stereoscopic display panel including a liquid crystal block having a rectangular parallelepiped shape or a cubic shape; and stripe-like shaped electrode films provided on two opposite faces and on another two opposite faces, each stripe-like shaped electrode film intersect the one on the opposite face, and each two opposite faces intersect the other two opposite faces.

2. A stereoscopic picture system comprising:

at least two cameras for identifying an image of a subject as electrical signals;

a control circuit for converting the electrical signals identified by the cameras and a difference between electrical signals in the cameras into stereoscopic image signals of an x-axis component, a y-axis component and a z-axis component;

a coordinate transformation circuit for creating a sectional image data in an arbitrary position of the subject from the stereoscopic image signals;

a signal-processing circuit for converting the sectional image data into three-dimensional control signals for the outline of the subject in the direction of x coordinate, y coordinate and z coordinate, by processing the sectional image data so that the outline of the image is shifted to the direction of at least x axis and y axis;

a stereoscopic display panel for displaying a stereoscopic picture, said stereoscopic display panel having three-dimensionally arranged pixels; and a driver circuit for driving the stereoscopic display panel on the basis of the control signals fed from the signal-processing circuit, wherein said stereoscopic display panel is three-dimensionally formed by superposing a plurality of flat display panels, said stereoscopic display panel including a liquid crystal block having a rectangular parallelepiped shape or a cubic shape; and stripe-like shaped electrode films provided on two opposite faces and on another two opposite faces, each stripe-like shaped electrode film intersect the one on the opposite face, and each two opposite faces intersect the other two opposite faces.

* * * * *